United States Patent [19]
Colburn et al.

[11] 4,148,003
[45] Apr. 3, 1979

[54] SERIES FEED-THROUGH CAPACITOR

[75] Inventors: Richard H. Colburn, Saugus; Donald A. Anderhalt, Valencia; Robert A. Stevenson, Canyon Country, all of Calif.

[73] Assignee: Globe-Union Inc., Milwaukee, Wis.

[21] Appl. No.: 813,784

[22] Filed: Jul. 8, 1977

[51] Int. Cl.² .................. H01H 7/14; H01G 4/42
[52] U.S. Cl. ........................ 333/181; 361/302; 361/329
[58] Field of Search ............ 361/302, 328, 329, 307, 361/321; 333/79

[56] References Cited
U.S. PATENT DOCUMENTS

| | | | |
|---|---|---|---|
| 1,327,593 | 1/1920 | Dublier | 361/329 |
| 2,550,308 | 4/1961 | Sporing | 361/307 |
| 3,235,939 | 2/1966 | Rodriguez | 361/321 |
| 3,289,276 | 12/1966 | Wasyluk | 333/79 X |
| 3,638,144 | 1/1972 | Denes | 333/79 |

Primary Examiner—E. A. Goldberg
Attorney, Agent, or Firm—John Phillip Ryan

[57] ABSTRACT

Feed-through capacitor of the type for use in filters and the like and including discoidal ceramic capacitors arranged in stacked relationship and electrically connected in series. Series arrangement of the discoidal capacitors prevents shorting through the feed-through capacitor in the event of failure of one of the discoidal capacitors therein and results in substantially improved insertion loss characteristics when compared to feed-through capacitors having a single discoidal capacitor.

12 Claims, 4 Drawing Figures

SERIES FEED-THROUGH CAPACITOR

BACKGROUND OF THE INVENTION

1. Field of the Invention

The present invention relates to ceramic capacitors and more particularly to ceramic feed-through capacitors wherein a pair of discoidal capacitors are arranged in series relationship and such that in the event that one of the discoidal capacitors fails, a second discoidal capacitor will be effective.

2. Description of the Prior Art

Ceramic feed-through capacitors are intended primarily to pass relatively low frequency electrical currents via a lead or conductor through an opening in a conducting wall, screen or the like while presenting a low impedance shunt path to the conducting wall for currents of very and ultra high frequencies. Capacitors of this type known in the art are shown, for example, by U.S. Pat. Nos. 3,243,671 issued Mar. 29, 1966 to Heron et al; 2,756,375, issued July 24, 1956 to Peck; and 3,617,830, issued Nov. 2, 1971 to Perna.

Ceramic feed-through capacitors are commonly used in electronic systems which cannot be easily serviced in applications such as missiles, satellites and space probes, for example. In the event such ceramic capacitors fail, failure is usually the result of shorting across the electrodes within the capacitor thereby causing shorting through the capacitor and consequent loss of the circuit employing the feed-through capacitor.

The possibility for capacitor failure can be reduced by extensive screening and testing of the capacitors before they are employed in a circuit, but it will be readily appreciated that such testing cannot completely preclude the potential of failure of the capacitor during its life. Furthermore, such testing is labor intensive, time consuming and costly.

In addition to, or as an alternative to, such preliminary screening, feed-through capacitors can be employed in series with a fuse device whereby failure of the capacitor by shorting will cause the fuse to function. Fusible capacitors of this type have been considered an improvement since an operational system, even though degraded by high frequency noise, in generally better than shorting and consequent failure of the entire circuit employing the capacitor.

Capacitors of types other than feed-through capacitors, for example, leaded capacitors, have been employed in series to provide a redundant device and to improve reliability. However, no means has been suggested in the prior art to facilitate connection of capacitors in series to form a feed-through capacitor while maintaining the high shielding integrity required of a feed-through capacitor.

Another inherent problem with feed-through capacitors is the occurrence of characteristic resonant dips in the insertion loss of such capacitors at specified frequency ranges, i.e., at specified resonant frequencies the insertion loss characteristic of the capacitor substantially decreases to ranges below desired values. And even though ceramic monolithic capacitors have decided advantages when compared to other types of capacitors in that the resonant dips in the insertion loss occur at relatively high frequencies and the amplitude of the dip is limited; even monolithic capacitors do not yield the results of a theoretically ideal capacitor.

SUMMARY OF THE INVENTION

The present invention provides a feed-through capacitor comprising redundant discoidal ceramic capacitors joined in series thereby yielding a feed-through capacitor which has the concurrent advantages of compensating for failure of one of the capacitors therein and also providing an unexpectedly high shielding integrity. The series feed-through capacitor of the invention also renders a device having substantially reduced insertion loss resonant dips and characteristics more nearly approximating an ideal capacitor than prior art feed-through capacitors.

The series feed-through capacitor of the invention includes a pair of ceramic discoidal capacitors in joined, stacked relationship and each having a central aperture therein. In the preferred form of the invention the discoidal capacitors have equal capacitance values. Each of the discoidal capacitors of the feed-through capacitor includes at least a pair of generally planar electrodes therein spaced apart by dielectric ceramic therebetween and includes an outer terminal band around its outer circumference connected to one of the electrodes and an inner terminal band around the circumference of its central aperture connected to the other electrode. The discoidal capacitors are of different diameter such that when the discoidal capacitors are stacked together, the outer terminal band of the smaller diameter capacitor is received against the inner terminal band around the circumference of the central aperture of the larger capacitor and these respective terminals are joined together whereby the capacitors are connected in series. A central conductor can be soldered or otherwise electrically connected to the inside termination band of the second or smaller discoidal capacitor and the outside termination band surrounding the first or larger discoidal capacitor can be electrically connected to a second conductor. The first and second discoidal capacitors are thus connected in series between the conductors.

The invention thus provides an improved feed-through capacitor wherein redundant ceramic discoidal capacitors are connected in series relationship and in a manner providing a compact integrally connected unit. By facilitating series connection of capacitors in a feed-through capacitor structure, the invention substantially improves the available reliability which can be expected from a feed-through capacitor since failure of one of the capacitors in the feed-through construction will be compensated for by the presence of a second capacitor.

A further advantage of the invention is that arrangement of a pair of discoidal capacitors in series in a feed-through construction is more effective in blocking high frequency noise than a single capacitor feed-through device.

Additionally, by use of a feed-through capacitor comprised of redundant capacitors in series, it may be possible to substantially reduce the cost of feed-through capacitors for some applications in that costly screening and testing may be avoided because of the substantially improved reliability provided by the use of a second or redundant discoidal capacitor. Screening and testing of capacitors before they are used frequently comprises a substantial portion of production cost of a feed-through capacitor. The risk of failure of the feed-through capacitor can be drastically reduced by constructing the feed-through capacitor with redundant discoidal capacitors in series. Consequently, in some applications a satisfactory feed-through capacitor can be produced without expensive screening or preliminary testing by joining two capacitors in series.

A further advantage of the invention is that the construction of the feed-through capacitor is such that if one of the discoidal capacitors fails shorted, even better attenuation of the capacitor may be achieved due to the capacitance increase, thereby increasing the noise filtering effectiveness of the feed-through capacitor.

A further and unexpected advantage of the invention is that aligning a pair of equal capacitance discoidal capacitors in a series relationship in a feed-through capacitor, results in a substantially improved insertion loss versus frequency response curve when compared to an equal capacitance feed-through capacitor including only a single capacitor. When tested on a spectrum analyzer with RF voltages at frequencies from 0 to 100 megahertz, the insertion loss values of a series feed-through capacitor of the invention are consistently more desirable than those seen when a feed-through capacitor having a single capacitor is similarly tested, and consequently a feed-through capacitor having series capacitors seems to be more effective in shunting noise than a conventional feed-through capacitor having a single capacitor.

DESCRIPTION OF A PREFERRED EMBODIMENT

Figure 1:
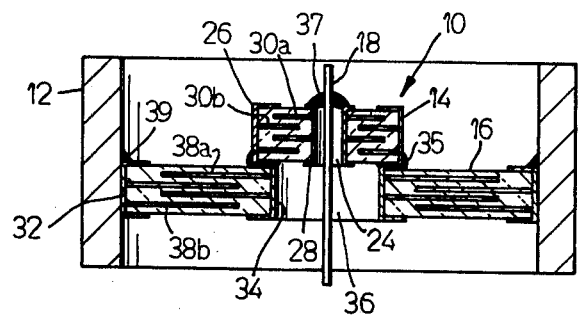
FIG. 1 is a cross-section enlarged side elevation view of a ceramic discoidal feed-through capacitor of the invention.
Figure 2:
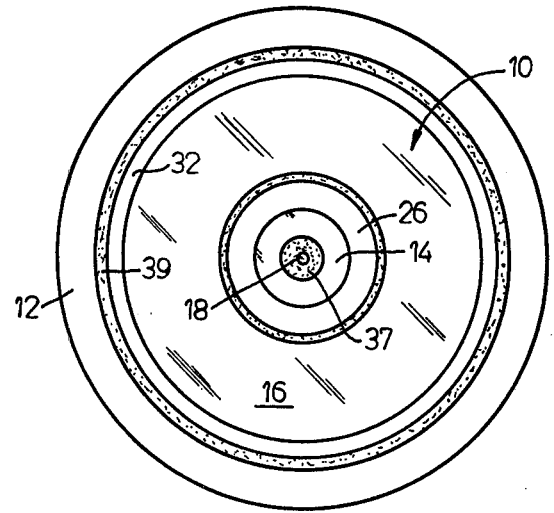
FIG. 2 is a plan view of the feed-through capacitor shown in FIG. 1.
Figure 3:
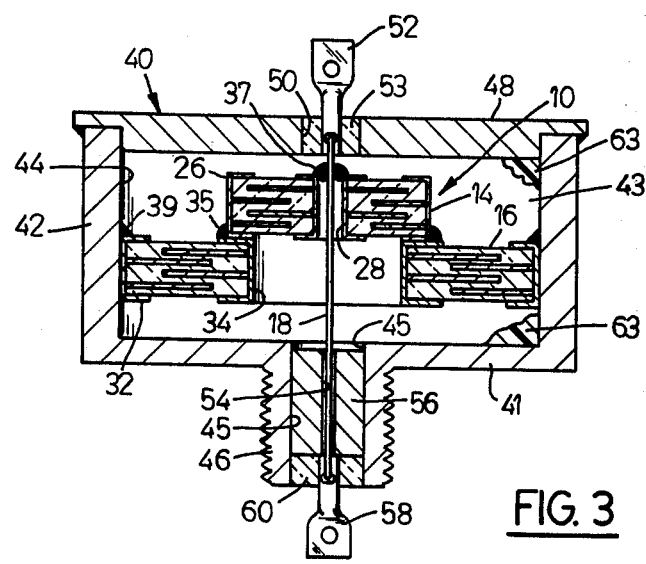
FIG. 3 is an enlarged cross-section view of a low pass filter including the feed-through capacitor of FIG. 1.

A series feed-through capacitor 10 is shown in an enlarged cross-sectional view in FIG. 1 as being located within a metal cylinder 12 and as generally including a pair of stacked discoidal ceramic monolithic capacitors 14 and 16 soldered together and including a central conductor 18 extending axially through central apertures in each of the capacitors 14 and 16. The series feed-through capacitor 10 can be used in a range of applications, such as multi-element filter circuits incorporating inductors, but is shown in FIG. 3, for purposes of example, as being used in a low pass filter to be described more fully hereinafter.

The capacitor 14 has a generally cylindrical or discoidal shape and includes a central axial aperture 24 therethrough for receiving the conductor 18. The circular outer periphery of the discoidal capacitor 14 is surrounded by an electrically conductive outer terminal band 26 comprised of silver or other commonly used highly electrically conductive metal or metal alloy, and the periphery of the central aperture or axial bore 24 similarly supports an inner terminal band 28 also comprised of silver or other conductive materials. The terminal band 26 is shown in FIG. 1 as including a first portion surrounding the outside circumference of capacitor 14 and overlapping edge portions supported by portions of the planar faces of the capacitor. The capacitor 14 also includes at least a pair of parallel, spaced apart, stacked interleaved electrode layers 30a and 30b therein, the electrode layers 30a and 30b being mutually separated by ceramic dielectric material such as a fired barium titanate. The planar electrode layers 30a are electrically connected to the inside terminal band 28 and the alternate electrode layers 30b are electrically connected to the outer terminal band 26.

The discoidal capacitor 16, like capacitor 14, includes an outer peripheral terminal band 32 and an inner terminal band 34 surrounding a central aperture or axial bore 36 in the lower discoidal capacitor 16. Terminal band 34 includes a portion surrounding the aperture 36 and integral overlapping edge portions supported by planar faces of the capacitor 16. The discoidal capacitor 16 also includes interleaved electrode layers 38a and 38b mutually separated by ceramic dielectric material and with electrode layers 38a being electrically connected to the terminal band 34 and electrode layers 38b being electrically connected to terminal band 32.

The two capacitors 14 and 16 are connected in series by positioning the capacitors in stacked axially aligned relationship such that an overlapping edge of the outer peripheral terminal band 26 of the smaller diameter capacitor 14 is positioned on and directly electrically connected to an overlapping edge of the inner peripheral terminal band 34 of the larger diameter discoidal capacitor 16. The terminals 26 and 34 are joined together by solder 35, the solder 35 providing an integral bond between the two discoidal capacitors 14 and 16 and connecting the capacitors in series. The conductor 18 extends axially through each of the central bores 24 and 36 in the discoidal capacitors and can be connected by solder 37 to the inner terminal band 28 of the discoidal capacitor 14, and the outside diameter terminal band 32 of the larger discoidal capacitor 16 is joined by solder 39 to the surrounding metal casing 12 which could comprise, for example, the metal can of a low pass filter as shown in FIG. 3. It will be readily appreciated by those skilled in the art that equal charge balance on the two capacitors 14 and 16 requires that the capacitors have capacitance and insulation resistance values which are substantially equal.

FIG. 3 of the drawings shows the series feed-through capacitor 10 of the invention employed, for purposes of example, in a low pass filter 40. The low pass filter 40 is generally comprised of an electrically conductive metal can or case 42 including a cavity 43 therein for receiving the feed-through capacitor 10. The metal can 42 includes a lower end wall 41 and a centrally located threaded stem 46 projecting downwardly from the end wall 41, the threaded stem 46 including a cylindrical bore 45 therein in communication with cavity 43. The projecting threaded stem 46 is intended to be threadably received in a threaded bore in a conductive wall or supporting substrate whereby the low pass filter 40 can be supported. The case 42 also includes a circular end seal plate 48 hermetically sealing the end of the metal can 42 opposite end wall 41 and soldered around its periphery to the metal can 42. The end seal plate 48 includes a central bore 50 receiving an electrically conductive terminal 52, the terminal 52 being supported in the bore 50 by a glass hermetic seal 53. The upper end of the central conductor 18 of the feed-through capacitor 10 is soldered at its upper end to the terminal 52 and its lower end extends through a central axial bore 54 in a generally cylindrical ferrite bead inductor 56 disposed within the cylindrical bore 45 in the threaded stem 46. The lower end of the central conductor 18 is soldered to a lower end terminal 58, in turn held in place by a glass hermetic seal 60 sealing the end of bore 45 in the threaded stem 46.

The feed-through capacitor 10 is suspended in spaced relation between the end wall 41 of the case and the end seal plate 48, the outer peripheral terminal band 32 of the series feed-through capacitor being joined by solder 39 to the inside surface 44 of the case 42, and the capacitors 14 and 16 being encased in epoxy resin 63 which fills the cavity 43 of the case.

It will be readily appreciated that the series feed-through capacitor 10 functions in effect as two capacitors connected in series between the central conductor 18 and the metal case 42 since the central conductor 18 is soldered to the inside terminal 28 of the upper capacitor 14 and the outside terminal 32 of the lower capacitor 16 is soldered to the case 42.

As previously stated, a connection of two capacitors in series has the effect of substantially increasing the reliability of the feed-through capacitor since failure of one of the capacitors will be compensated for by the remaining functional capacitor. Monolithic discoidal capacitors of the type referred to above may have a reliability, for purposes of example, in the range of 1 failure/$6 \times 10^5$ hours. The probability of two defective capacitors being joined in series in the same unit becomes:

$$\frac{1}{6 \times 10^5} \times \frac{1}{6 \times 10^5} = \frac{1 \text{ failure}}{3.6 \times 10^{11} \text{ hours}}$$

Thus, it can be seen that by providing a means for connecting discoidal ceramic capacitors in series, the present invention provides a feed-through capacitor with a markedly greater factor of reliability.

Assuming one of the monolithic capacitors fails during operation, the full applied voltage on the series feed-through capacitor will be applied to the unshorted capacitor and the net capacitance of the series feed-through capacitor will increase to the value of the unshorted capacitor. This increase in capacitance value will have the advantage of increasing the insertion loss of the feed-through capacitor and causing the resonant frequency at which the insertion loss dip occurs to shift to a lower frequency. The performance of the feed-through capacitor will thus be maintained or improved despite failure of one of the capacitors therein.

Figure 4:
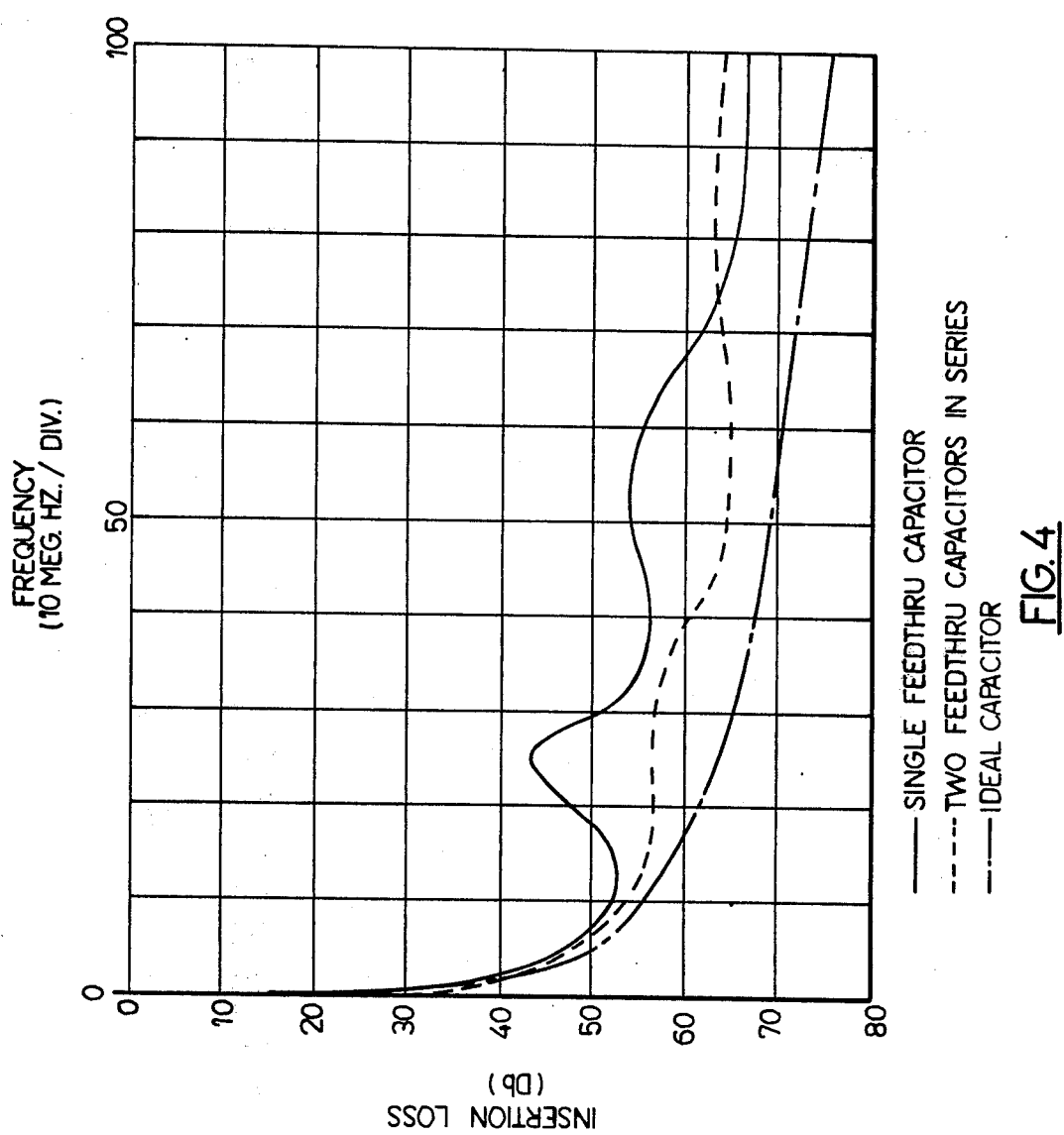
FIG. 4 is a graph illustrating insertion loss versus frequency curves for an ideal capacitor, a single feed-through capacitor and a series feed-through capacitor.

A series feed-through capacitor of the type shown in FIG. 1 was constructed, capacitors 14 and 16 each having a capacitance value of 0.75 microfarads. The resulting series feed-through capacitor was tested using a conventional spectrum analyzer to determine the insertion loss characteristics of the series capacitor when tested in a 50 ohm system at continuous frequencies of 0–100 MegHz. FIG. 4 illustrates the output of the spectrum analyzer showing a curve (the dotted line) representing the insertion loss characteristic of the series feed-through capacitor in decibels as a function of the frequency applied to the feed-through capacitor. The broken line illustrates the similar insertion loss characteristics of a theoretical "ideal" feed-through capacitor as frequency applied to that capacitor varies from 0 MegHz to 100 MegHz. The solid line illustrates the insertion loss characteristic curve as a function of frequency for a feed-through capacitor having a single monolithic discoidal ceramic capacitor therein.

Ceramic monolithic capacitors have distinctive advantages over other well known types of capacitors used to function as a feed-through device in that the insertion loss versus frequency curves derived from such capacitors most closely approximate the ideal capacitor curve shown in FIG. 4. However, it is readily apparent from FIG. 4 that the feed-through capacitor having monolithic discoidal capacitors in series renders an insertion loss versus frequency curve even more closely approximating the curve of an ideal capacitor than a feed-through capacitor having a single monolithic discoidal ceramic capacitor though the resultant capacitance value of two 0.75 microfarad capacitors connected in series (0.3645 microfarads) is substantially equal to the capacitance (0.3572 microfarads) of the single capacitor feed-through capacitor.

It will be readily appreciated by those skilled in the art that the series feed-through capacitor of the invention is an improvement over the single capacitor series feed-through capacitor in that the amplitude of resonant frequency dips in insertion loss value are substantially decreased. At frequencies between 20–30 MegHz the single feed-through capacitor tested showed a substantial dip in insertion loss as shown in FIG. 4. The series feed-through capacitor of the invention, however, substantially decreased that insertion loss dip. Such reduction in the amplitude of the resonant frequency insertion loss dips appears to be due to increase in the series resistance of the capacitor equivalent circuit. This series resistance reduces the Q factor of the tuned circuit thereby tending to swamp out the resonant dip.

We claim:
1. A series feed-through capacitor comprising:
a first discoidal capacitor having top and bottom discoid surfaces and an aperture extending through said discoid from said top surface to said bottom surface, said first capacitor including an outer circumferential portion having an outer terminal band secured thereto, said aperture having a periphery, an inner terminal band secured to said periphery, said terminal bands each having an overlapping edge portion covering less than a major portion of at least one of said discoid surfaces, and at least a pair of parallel spaced apart electrodes separated by a dielectric material, one of said paired electrodes being electrically connected to said outer terminal band and the other of said paired electrodes being electrically connected to said inner terminal band;
a second discoidal capacitor having top and bottom discoid surfaces and an aperture extending through said discoid from said top surface to said bottom surface and having an outer circumferential portion having an outer electrically conductive terminal band secured thereto, said aperture having a periphery having an inner electrically conductive terminal band secured thereto, said terminal bands each having an overlapping edge portion covering less than a major portion of at least one of said discoid surfaces, and at least a second pair of parallel spaced apart electrodes separated by a dielectric material, one of said second pair of electrodes being electrically connected to said outer terminal band of said second capacitor and the other of said second pair of electrodes being electrically connected to said inner terminal band of said second capacitor; and
said second discoidal capacitor being secured and electrically joined to said first discoidal capacitor, said capacitors having said overlapping edge portions of said outer terminal band of said second capacitor and said inner terminal band of said first capacitor physically directly joined in a juxtaposed contiguous relationship.

2. The series feed-through capacitor set forth in claim 1 wherein each of said capacitors have a central axis and said first and second capacitors are stacked together in coaxial parallel adjacent relationship and wherein said second capacitor has a circumference less than the circumference of said first discoidal capacitor and greater than the circumference of the aperture of said first discoidal capacitor and said outer terminal band overlapping edge portion of said second capacitor rests on the inner terminal band overlapping edge portion of said first capacitor in concentric relation.

3. The series feed-through capacitor set forth in claim 1 further including a single continuous conductor positioned within said apertures, said conductor being physically directly and electrically connected to said inner terminal band of said second capacitor.

4. The series feed-through capacitor set forth in claim 3 further including an electrically conductive cylinder surrounding said first and second capacitors, said cylinder having in internal side wall, said outer terminal band of first capacitor being physically directly and electrically connected to said cylinder side wall.

5. The series feed-through capacitor set forth in claim 2 further including a conductor positioned within said apertures, said conductor being physically directly and electrically connected to said inner terminal band of said second capacitor.

6. The series feed-through capacitor set forth in claim 5 further including an electrically conductive cylinder surrounding said first and second capacitors, said cylinder having in internal side wall, said outer terminal band of first capacitor being physically directly and electrically connected to said cylinder side wall.

7. A series feed-through capacitor comprising:
a container having an electrically conductive side wall;
a first discoidal capacitor having top and bottom discoid surfaces and a central axial aperture therethrough and an outer circumferential portion having an outer terminal band secured thereto, said outer terminal band having an edge portion adjacent said outer circumferential portion and an edge of at least one of said discoid surfaces, said aperture having a periphery, an inner terminal band secured to said periphery, said inner terminal band having an edge portion adjacent said periphery and an edge of at least one of said discoid surfaces, and at least a pair of parallel spaced apart electrodes in interleaved relationship and separated by dielectric material, one of said paired electrodes being electrically connected to said outer terminal band and the other of said paired electrodes being electrically connected to said inner terminal band, said outer terminal band being fixedly secured to said container side wall by direct physical contact to establish an electrically conducting relationship therebetween;
a second discoidal capacitor having top and bottom discoid surfaces and a central aperture therethrough and having an outer circumferential portion having an outer electrically conductive terminal band secured thereto, said outer terminal band having an edge portion adjacent said outer circumferential portion and an edge of at least one of said discoid surfaces, said aperture having a periphery having an inner electrically conductive terminal band secured thereto, said inner terminal band having an edge portion adjacent said periphery and an edge of at least one of said discoid surfaces, and at least a pair of parallel spaced apart electrodes in interleaved relationship and separated by dielectric material, one of said paired electrodes being electrically connected to said outer terminal band of said second discoidal capacitor and the other of said paired electrodes being electrically connected to said inner terminal band of said second discoidal capacitor;
said second discoidal capacitor being secured and electrically joined to said first discoidal capacitor, said capacitors having said edge portions of said outer terminal band of said second capacitor and said inner terminal band of said first capacitor in direct physical contact to join juxtaposed contiguous edge portions of said inner and outer terminal bands; and
an elongated conductor having at least a portion thereof in said container and extending through said apertures, said elongated conductor being physically directly and electrically connected to said inner terminal band of said second capacitor.

8. The series feed-through capacitor set forth in claim 7 wherein said container is generally cylindrical having a central axis and defines a closed cavity therein, said first and second capacitors being generally coaxial with said central axis, and said conductor having opposite ends and disposed along said central axis, said opposite ends of said conductor extending from said container.

9. The series feed-through capacitor set forth in claim 7 wherein each of said capacitors have a central transverse axis and said first and second capacitors are stacked together in coaxial parallel adjacent relationship and wherein said second capacitor has a circumference less than the circumference of said first discoidal capacitor and greater than the circumference of the aperture of said first discoidal capacitor.

10. The series feed-through capacitor set forth in claim 9 wherein said terminal band edge portions overlap and cover less than a major portion of said adjacent discoid surfaces and the overlapping edge portion of said outer terminal band of said second capacitor rests on the overlapping edge portion of the inner terminal band of said first capacitor in concentric relation.

11. A series feed-through capacitor as set forth in claim 8 includes an inductor disposed about said central axis within said cavity intermediate a surface of one of said capacitors and an adjacent end of said conductor.

12. A series feed-through capacitor as set forth in claim 7 includes an inductor disposed about said conductor within said container spatially separated from said capacitors.

* * * * *